US011778996B2

(12) United States Patent
Arnoldson et al.

(10) Patent No.: US 11,778,996 B2
(45) Date of Patent: Oct. 10, 2023

(54) SYSTEM AND METHOD FOR ATTRACTING CRUSTACEANS AND OTHER AQUATIC LIFE

(71) Applicant: SPFM, L.P., San Antonio, TX (US)

(72) Inventors: Erick Oscar Jorge Arnoldson, San Antonio, TX (US); Basil E. Battah, San Antonio, TX (US)

(73) Assignee: SPFM, L.P., San Antonio, TX (US)

( * ) Notice: Subject to any disclaimer, the term of this patent is extended or adjusted under 35 U.S.C. 154(b) by 373 days.

(21) Appl. No.: 16/785,358

(22) Filed: Feb. 7, 2020

(65) Prior Publication Data

US 2020/0260701 A1    Aug. 20, 2020

Related U.S. Application Data

(60) Provisional application No. 62/803,042, filed on Feb. 8, 2019.

(51) Int. Cl.
*A01K 69/06*    (2006.01)
*G06F 3/16*    (2006.01)
*H04R 1/02*    (2006.01)

(52) U.S. Cl.
CPC .............. *A01K 69/06* (2013.01); *G06F 3/165* (2013.01); *H04R 1/028* (2013.01)

(58) Field of Classification Search
None
See application file for complete search history.

(56) References Cited

U.S. PATENT DOCUMENTS

| 4,805,339 | A | 2/1989 | Fuentes et al. | |
| 5,331,760 | A * | 7/1994 | DuMont | A01K 93/02 43/17.1 |
| 7,263,033 | B2 | 8/2007 | Borsina et al. | |
| 2002/0116862 | A1 | 8/2002 | McNeil | |
| 2003/0019144 | A1 | 1/2003 | Thompson | |
| 2006/0268664 | A1* | 11/2006 | Lewis | A01K 79/02 367/139 |

OTHER PUBLICATIONS

International Search Report and Written Opinion received in corresponding International Application No. PCT/US2020/017312, dated Apr. 24, 2020.

* cited by examiner

*Primary Examiner* — Duane N Taylor, Jr.

(57) ABSTRACT

An improved lure for attracting aquatic life, specifically crabs, that utilizes interchangeable sound cartridges. The improved lure utilizes a fully submersible portable unit that hoses all sound production components, including a speaker, and a power source. The improved lure may be configured for activation in low-light settings and for use in connection with traps.

14 Claims, 2 Drawing Sheets

SYSTEM AND METHOD FOR ATTRACTING CRUSTACEANS AND OTHER AQUATIC LIFE

BACKGROUND AND SUMMARY OF THE PRESENT INVENTION

While there are several examples of systems for attracting aquatic life in the prior art, many are intended for personal use and require that a lure be tethered to a fishing rod or be communicably coupled to some control apparatus. By contrast, the present invention contemplates a self-contained unit specifically designed for larger scale commercial fishing operations.

Certain embodiments of the present invention are designed to attract crustaceans or fish directly towards a sound source emitting synthetic sounds. Such embodiments comprise a portable unit that may be deployed according to a number of configurations.

BRIEF DESCRIPTION OF THE DRAWINGS

All illustrations of the drawings are for the purpose of describing selected embodiments of the present invention and are not intended to limit the scope of the present invention.

DETAILED DESCRIPTION OF EMBODIMENTS OF THE PRESENT INVENTION

Figure 1:
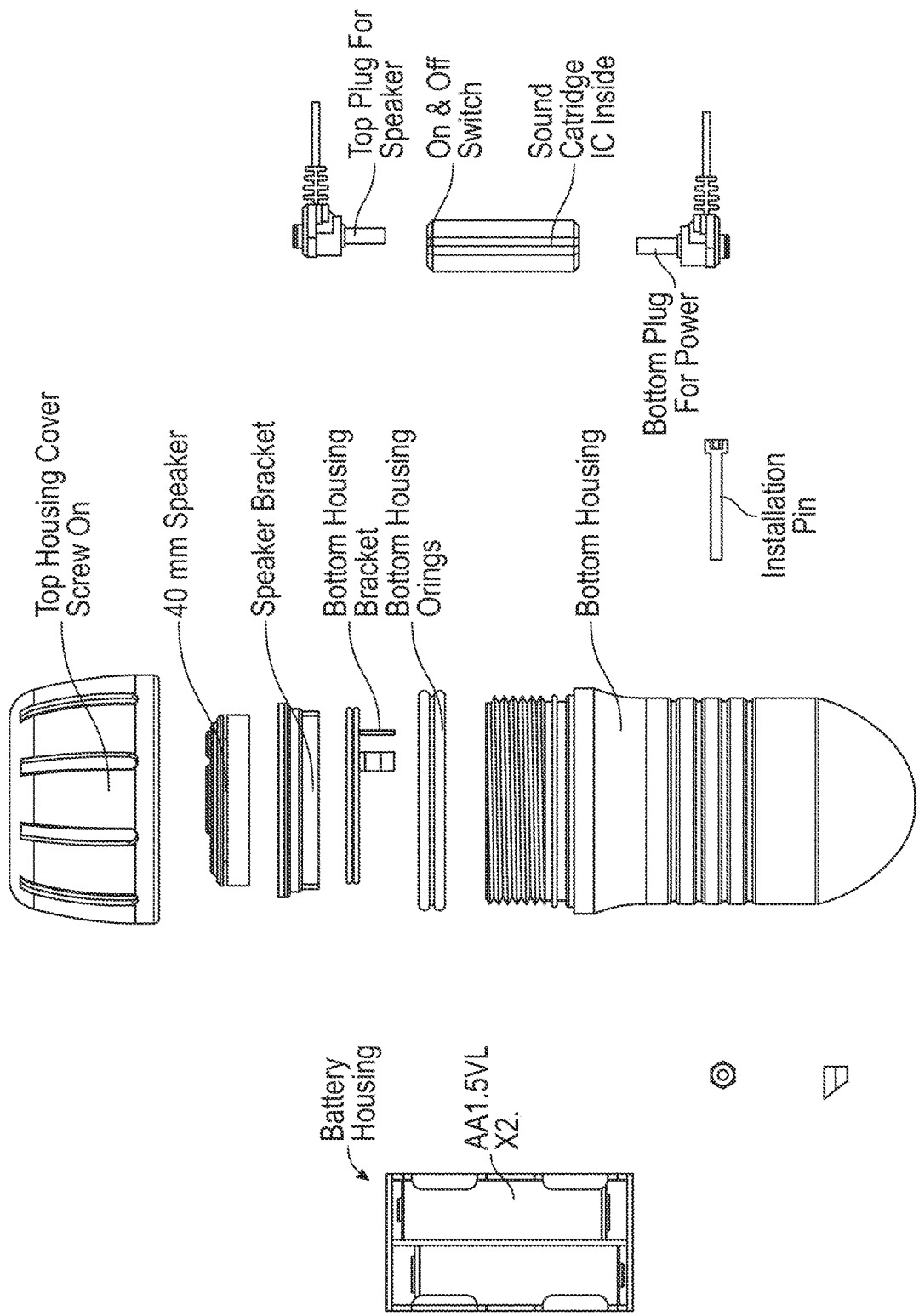
FIG. 1 is an exploded front view of the portable unit of one embodiment of the present invention.
Figure 2:
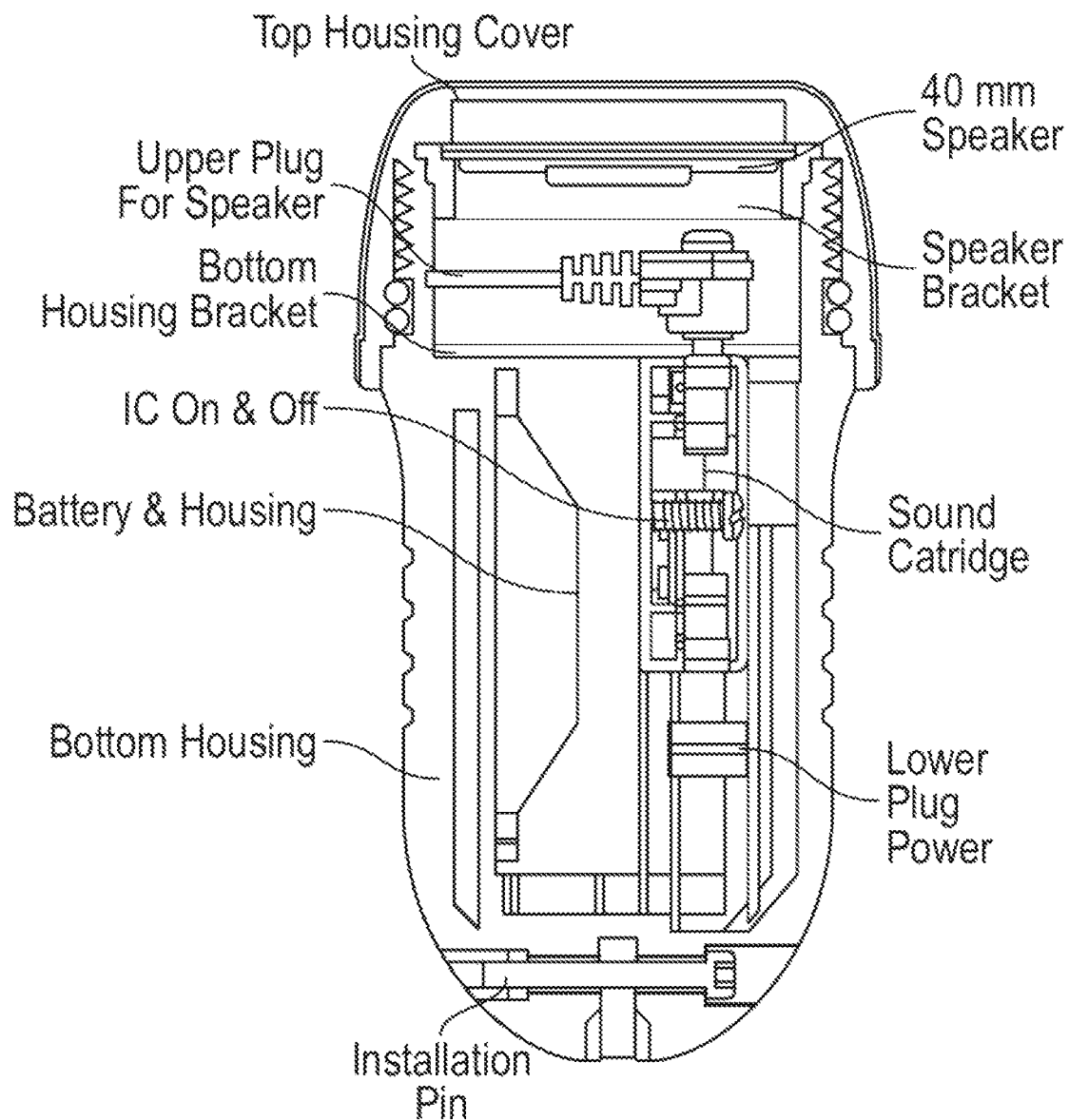
FIG. 2 is a rear sectional view of the portable unit of one embodiment of the present invention.

This description as well as FIGS. 1 and 2 depict embodiments of the present invention as they relate to a lure designed for use in commercial fishing.

In one embodiment of the present invention, the lure comprises a portable unit. The portable unit comprises a main body portion. The main body portion may be substantially cylindrical in shape. The main body portion comprises an interior volume into which sound producing components may be disposed. The sound producing components may include sound cartridge configured to cause simulated sounds designed to attract aquatic life to be played through a speaker that is operably coupled to the sound cartridge. The sound cartridge comprises an integrated circuit board or chip. The integrated circuit board may include a microcontroller and memory for storing the simulated sounds. The sound cartridge is further coupled to a power source also disposed within the main body portion.

In further embodiments, the internal, integrated circuit board is a Bluetooth low energy (BLE) board. A light-emitting diode (LED) light sensor may be coupled to the portable unit's internal circuitry. The LED light sensor may be configured to cause a change in the portable unit's power state (on/off) based on the presence or absence of light.

In some embodiments, the portable unit further comprises a removable cap. The removable cap is configured for reversible engagement with the main body portion. In such embodiments, the speaker is internal to the portable unit when the removable cap is engaged with the main body portion. When the removable cap is disengaged from the main body portion, access to the interior volume is granted and the sound cartridge may be removably inserted into the interior volume. Additionally, disengaging the removable cap from the main body portion allows for replacement of the power source. It is envisioned that during typical use of these embodiments of the present invention, a plurality of sound cartridges, each storing a different sound, may be used interchangeably within the portable unit.

In further embodiments, when the removable cap is engaged with the main body portion, a watertight seal is formed to prevent water from entering the interior volume.

In even further embodiments, the speaker may be caused to produce signals that simulate water splashing, the gurgling and moving of waves, and currents or tidal shift against reefs or other geographical features on the ocean floor. The sound cartridge causes the sounds to be played on a loop when the portable unit is powered on.

In certain embodiments, when powered on, the portable unit produces through the speaker low frequency signals, well-known in the art, that emulate a targeted species's acoustical signal that said species emits while feeding. The speaker in this embodiment has an effective attractive radius of 100 meters.

In further embodiments, the portable unit produces low frequency sound pressure, at frequencies well-known in the art, through the speaker and has an effective range of 1,000 meters.

In some embodiments, the power source providing power for the sound producing functionality of the portable unit is two (2) AA LR6 1.5V batteries connected in parallel, and the portable unit has an expected battery life of 400 hours when powered on.

In one embodiment, the main body portion has a length of 111.15 mm, a diameter of 47.68 mm, and a wall thickness of 3 mm. In this embodiment, the main body portion is constructed of ABS 90 (acrylonitrile butadiene styrene). Additionally, the speaker is a 40 mm speaker.

In certain embodiments of the present invention, the portable unit may be configured for placement inside square traps. The portable unit may be attached on the top of a trap or inside bait bags. When these traps are deployed, they may come to rest on the ocean floor or be suspended from a fixed structure. In further embodiments, the portable unit may be deployed independent from a trap.

In one embodiment, the portable unit is adapted for use at depths between 38 meters (125 feet) and 182 meters (600 feet).

In some embodiments, the main body portion further comprises an inner housing bracket for supporting its internal components. In these embodiments, the main body portion further comprises a speaker bracket to support and secure the speaker within the portable unit.

Although the present invention has been explained in relation the various embodiments, it is to be understood that many other possible modifications and variations can be made, and would be understood by those persons of ordinary skill in the art, without departing from the spirit and scope of the invention.

The invention claimed is:

1. A lure for attracting aquatic life comprising:
 a submersible main body portion, wherein said submersible main body portion has an interior volume; a removable internal circuit board disposed within said interior volume comprising:
 memory having stored thereon at least one synthetic sound for attracting the aquatic life;
 a speaker operably coupled to said removable internal circuit board and configured to emit said at least one synthetic sound for attracting the aquatic life;

a power source operably coupled to said removable internal circuit board and disposed within said interior volume; and a removable cap configured for reversible engagement with said submersible main body portion.

2. The lure of claim 1 wherein said at least one synthetic sound for attracting the aquatic life is a simulated feeding sound of a species of aquatic lite.

3. The lure of claim 2 wherein said species of aquatic life is crabs.

4. The lure of claim 1 wherein said at least one synthetic sound for attracting the aquatic life is one of: a simulated water splashing sound, a simulated sound of wave gurgling, a simulated sound of wave movement, a simulated sound of water currents, a simulated sound of tidal shifts on a reef, a simulated sound of water interacting with geographic features on an ocean floor, or non-naturally occurring sound waves designed to attract rather than repel the aquatic life.

5. The lure of claim 1 wherein said at least one synthetic sound for attracting the aquatic life causes production of low frequency sound pressure when emitted by said speaker.

6. The lure of claim 1 wherein said submersible main body portion is substantially cylindrical in shape.

7. The lure of claim 1 wherein said submersible main body portion is configured for reversible engagement with a square crab trap.

8. The lure of claim 1 wherein said submersible main body portion is configured for deployment at depths of at least 100 ft.

9. The lure of claim 1 wherein said submersible main body portion is configured for deployment at depths of at least 600 ft.

10. The lure of claim 1 further including an LED light sensor for actuating the switch from the off state to the on state responsive to detection of an absence of light within the interior volume.

11. The lure of claim 1 further including:
a first plug for removable connecting the internal sound cartridge to the speaker; and;
a second plug for removable connecting the power source to the internal sound cartridge.

12. The lure of claim 1 wherein the internal sound cartridge may be exchanged for second removable internal sound cartridge to provide a second synthetic sound.

13. A lure for attracting aquatic life comprising:
a submersible main body portion, wherein said main body portion has an interior volume;
a removable cap configured to threadedly engage with said main body portion to provide a watertight seal of the interior volume;
a single one of a plurality of removable internal sound cartridges for providing a synthetic sound for attracting aquatic life disposed within said interior volume, each of the plurality of removable sound cartridges providing a different synthetic sound for attracting aquatic life;
a speaker operably coupled to said removable internal sound cartridge via a first plug and configured to emit said at least one synthetic sound for attracting aquatic life; and
a power source operably coupled to said internal sound cartridge via a second plug and disposed within said interior volume for powering said internal sound cartridge.

14. A lure for attracting aquatic life comprising:
a submersible main body portion, wherein said main body portion has an interior volume;
a removable cap configured to threadedly engage with said main body portion to provide a watertight seal of the interior volume;
a removable internal sound cartridge disposed within said interior volume comprising:
 memory having stored thereon at least one synthetic sound for attracting aquatic life;
 a switch for actuating the removable sound cartridge between an on state and an off state located within the interior volume;
a speaker operably coupled to said removable internal sound cartridge via a first plug and configured to emit said at least one synthetic sound for attracting aquatic life; and
a second plug for operably coupling the removable internal sound cartridge with a power source within said interior volume for powering said internal sound cartridge.

* * * * *

UNITED STATES PATENT AND TRADEMARK OFFICE
CERTIFICATE OF CORRECTION

PATENT NO. : 11,778,996 B2
APPLICATION NO. : 16/785358
DATED : October 10, 2023
INVENTOR(S) : Erick Oscar Jorge Arnoldson et al.

It is certified that error appears in the above-identified patent and that said Letters Patent is hereby corrected as shown below:

In the Claims

Column 2, Claim 1:
Lines 59-60, "wherein said submersible main body portion" should read -- wherein said main body portion --;
Line 60, "an interior volume;" should read -- an interior volume; a removable cap configured to threadedly engage with said main body portion to provide a watertight seal of the interior volume; --;
Line 61, "removable internal circuit board" should read -- removable internal sound cartridge --;
Line 64, "attracting the aquatic life;" should read -- attracting aquatic life; --;
Line 64, "aquatic life;" should read -- aquatic life; a switch for actuating the removable sound cartridge between an on state and an off state located within the interior volume; --;
Line 66, "a removable internal circuit board" should read -- a removable internal sound cartridge --;
Line 67, "attracting the aquatic life;" should read -- attracting aquatic life; --;
Line 67, "aquatic life;" should read -- aquatic life; and --.

Column 3, Claim 1:
Lines 1-2, "coupled to said removable internal circuit board" should read -- coupled to said internal sound cartridge --;
Lines 3-5, "volume; and a removable cap configured for reversible engagement with said submersible main body portion." should read -- volume for powering said internal sound cartridge. --;

Column 3, Claim 2:
Line 7, "attracting the aquatic life" should read -- attracting aquatic life --;

Column 3, Claim 4:
Line 11, "attracting the aquatic life" should read -- attracting aquatic life --;
Line 17, "repel the aquatic life" should read -- repel aquatic life --;

Signed and Sealed this
Twenty-first Day of May, 2024

Katherine Kelly Vidal
*Director of the United States Patent and Trademark Office*

Column 3, Claim 5:
Line 19, "attracting the aquatic life causes production" should read -- attracting aquatic life causes the production --;

Column 3, Claim 6:
Line 21, "wherein said submersible main" should read -- wherein said main --;

Column 3, Claim 7:
Line 23, "wherein said submersible main" should read -- wherein said main --;

Column 3, Claim 8:
Line 26, "wherein said submersible main" should read -- wherein said main --;

Column 3, Claim 9:
Line 29, "wherein said submersible main" should read -- wherein said main --.